Inventor:
HALE PAXTON

Oct. 31, 1933.　　　　H. PAXTON　　　　1,933,147
BOX SEGREGATING AND STACKING DEVICE
Filed Oct. 3, 1931　　　6 Sheets-Sheet 2
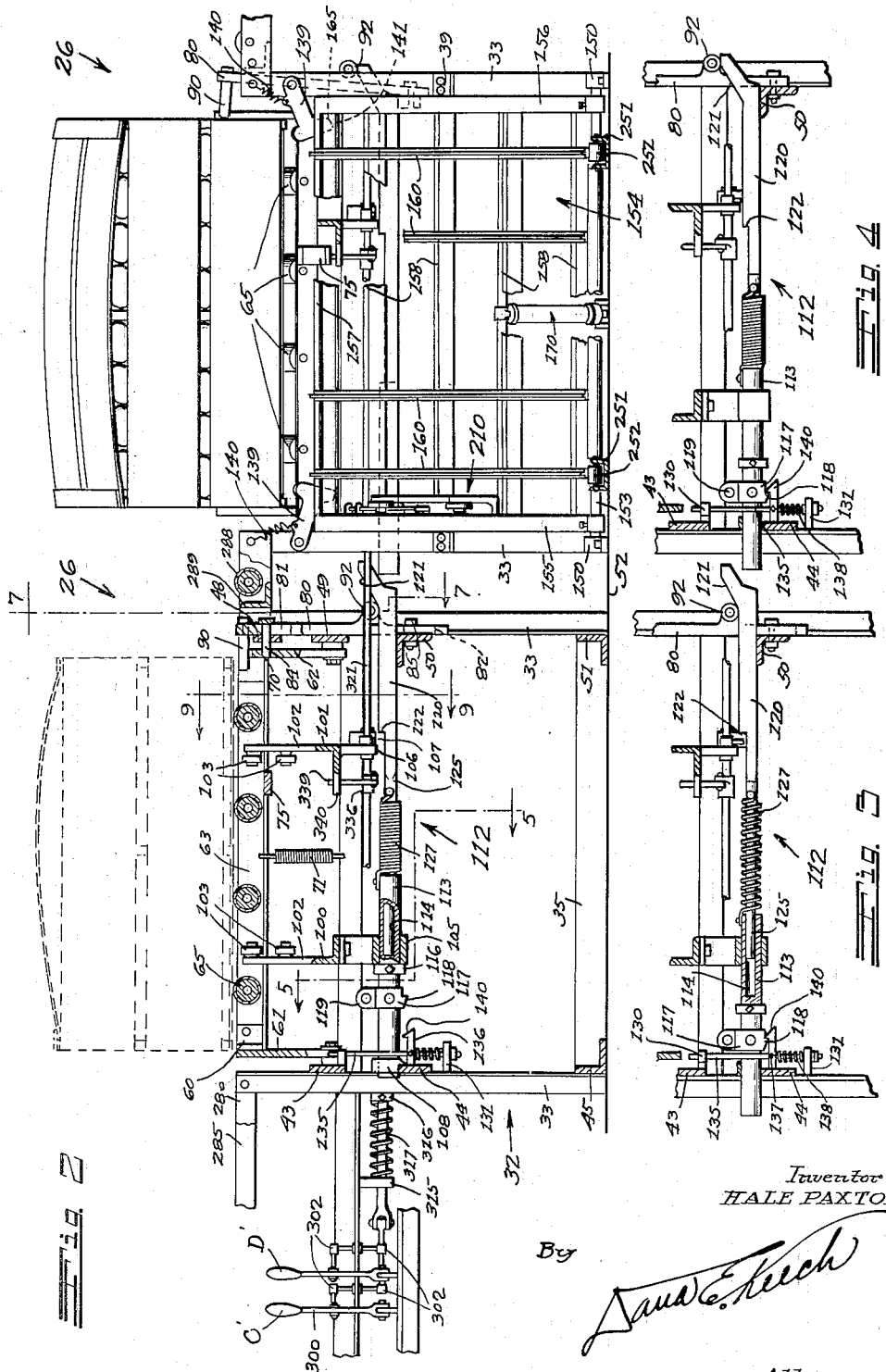
Inventor:
HALE PAXTON,
By
Attorney.

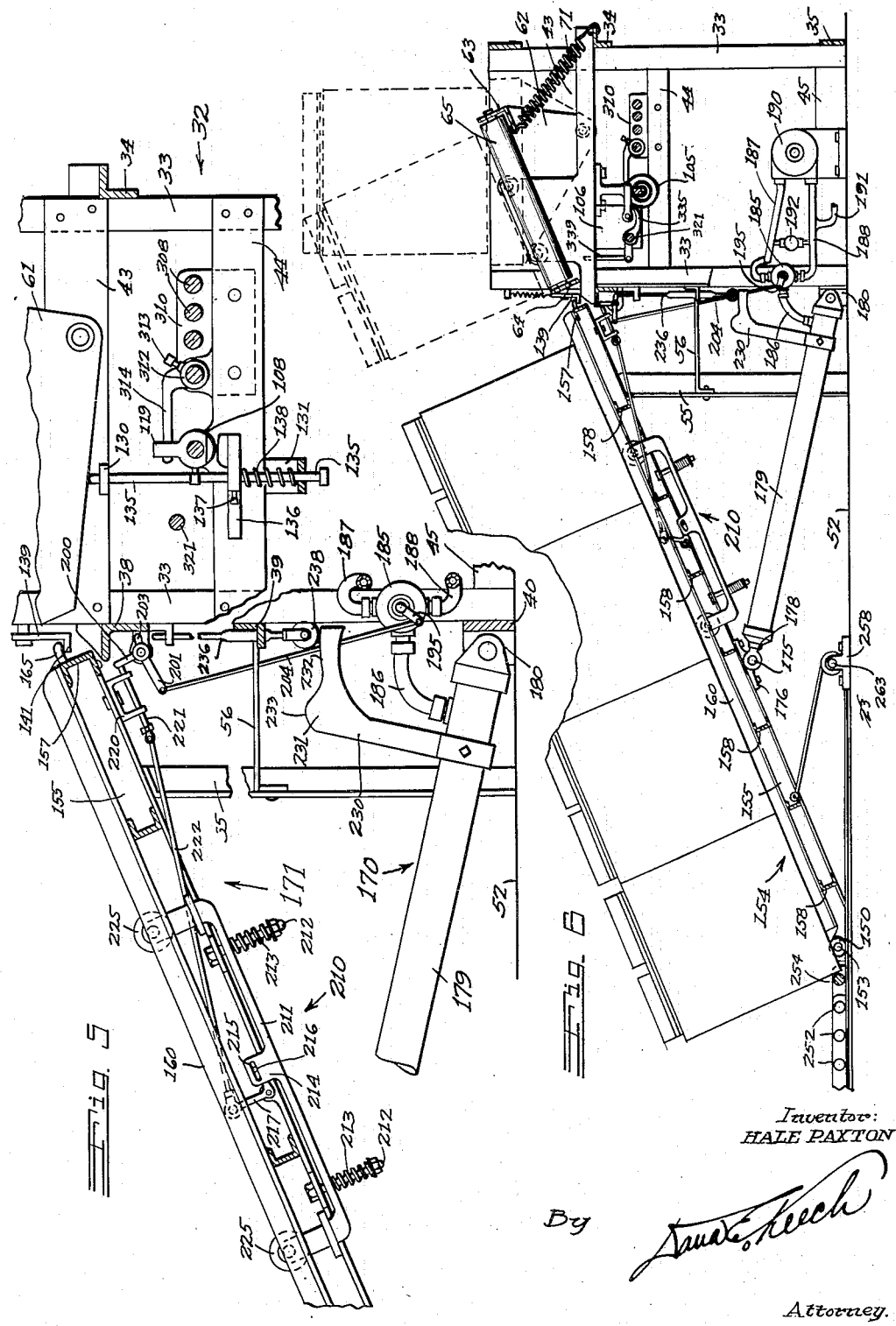

Oct. 31, 1933.　　　　H. PAXTON　　　　1,933,147
BOX SEGREGATING AND STACKING DEVICE
Filed Oct. 3, 1931　　　6 Sheets-Sheet 4

Inventor;
HALE PAXTON;
By
Attorney.

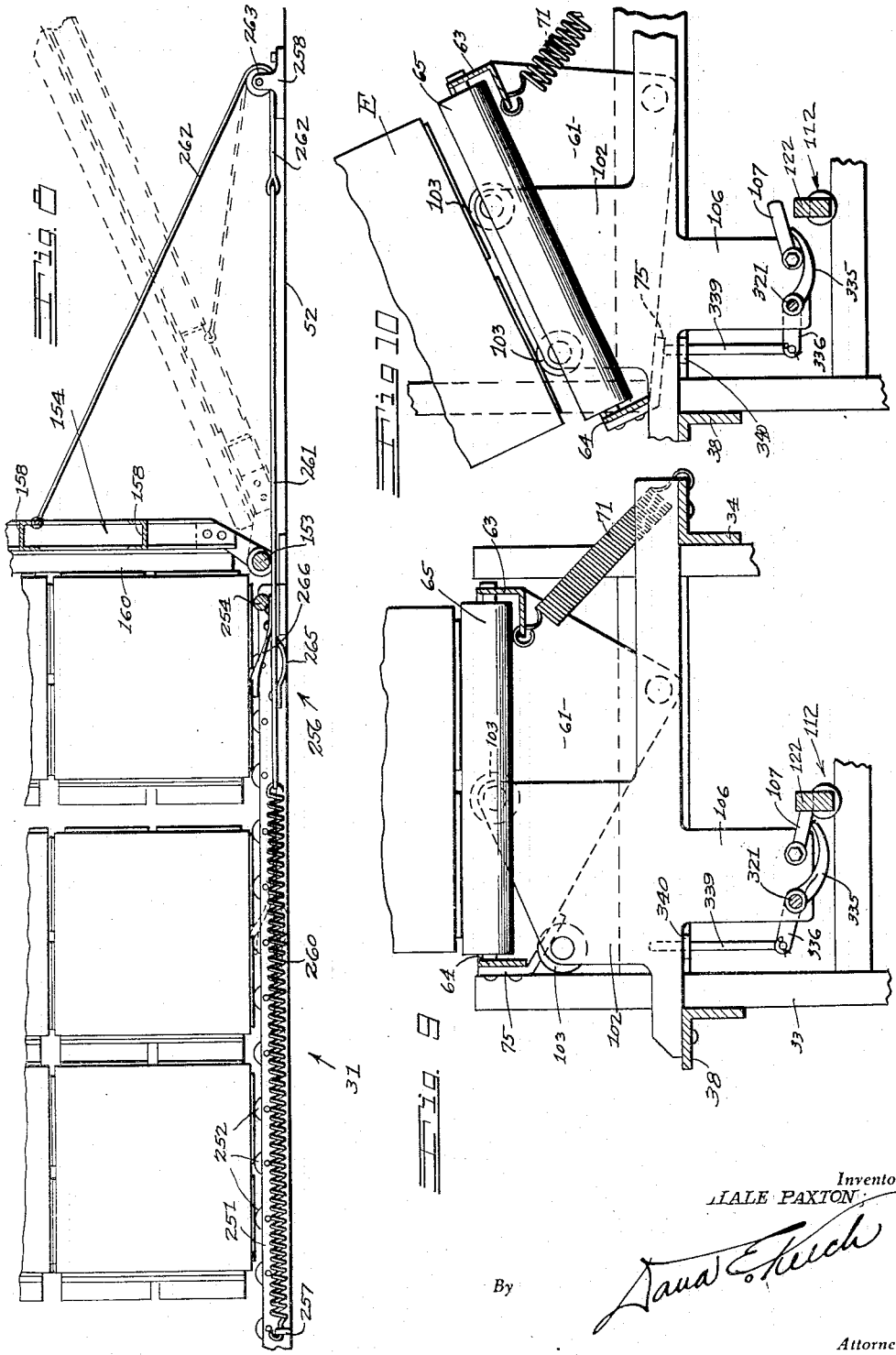

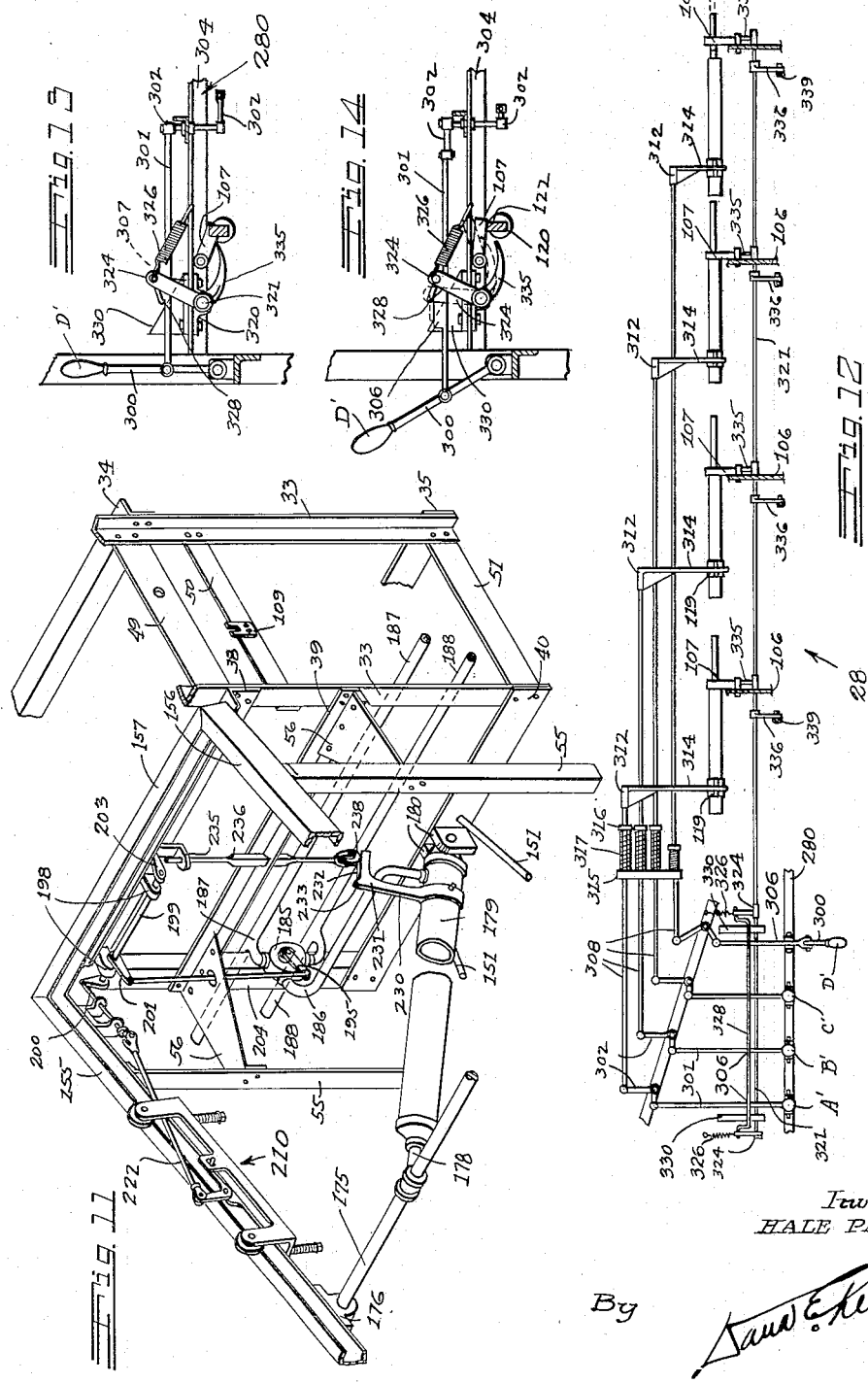

Patented Oct. 31, 1933

1,933,147

UNITED STATES PATENT OFFICE 1,933,147

BOX SEGREGATING AND STACKING DEVICE

Hale Paxton, Redlands, Calif., assignor to Paxton Credit Corporation, Sanger, Calif., a corporation of California Application October 3, 1931. Serial No. 566,824

8 Claims. (Cl. 198—66)

My invention relates to handling packed boxes of fruit and similar packaged goods which it is desirable to segregate and form into stacks incidental to their handling.

While my invention is adaptable for use in many industries, it has special utility in the fresh fruit packing industry and accordingly will be illustrated herein by the disclosure of an embodiment designed for this use.

In the fresh fruit packing industry, particularly in the packing of apples, grapes, citrus fruits, and the like, the fruit is packed in cases and the latter are collected on a conveyer and delivered to a lidder which applies a lid thereto. Each lot of fruit is generally divided into different grades of fruit which are packed under different brands and the boxes containing different brands of fruit are all mixed up when they are delivered to the lidder. At the present time, it is accordingly necessary for one or more men to devote their time to segregating the boxes of various brands of fruit so that all those of each brand will be stacked together.

It is an object of my invention to provide a machine which is controllable by the operator of the lidder in a fresh fruit packing house which will segregate the boxes discharged from the lidder according to the will of the lidder operator and form these into stacks as segregated.

The usual number of different brands into which a lot of fruit is packed do not generally exceed four in number, and in the embodiment of my invention disclosed herein means for handling this number of segregations is shown. The device is thus sufficiently compact that at the usual rate of lidding boxes, which does not exceed six hundred to the hour, not over two boxes need be handled by my invention at any one time. It is desirable, of course, that the selection of the group to which any given box is to be directed should be made by the lidder operator at some specified time while he is handling the box. It is preferable, of course, that this selection by the lidder operator take place when he pulls the box into the lidder and has the label of the box in full view. At this time, of course, he has just discharged a previously lidded box from the lidder, which box is now traveling along the stacker.

It is a further object of my invention, therefore, to provide a box segregating and stacking device in which the operator may set the control mechanism for determining which group a second box is to be delivered to by the device while a first box is still traversing said device.

It is a further object of my invention to provide a box segregating and stacking device which is constructed in units so that where it is desired to increase the number of groups into which the lidded boxes are segregated this may be taken care of by merely adding an additional unit to the device as installed.

The manner of accomplishing the foregoing objects, as well as further objects and advantages, will be made manifest in the following description together with the accompanying drawings, in which:

Fig. 2 is a fragmentary enlarged front elevational view of the first and second units of the device shown in Fig. 1 with portions thereof broken away to illustrate the mechanism.

Fig. 3 is a fragmentary diagrammatic view illustrating the trip operating mechanism of one unit in set position, the mechanism being under restraint.

Fig. 4 is a view similar to Fig. 3 showing a trip operating mechanism when set with the restraint removed so that the trip is actuated.

Fig. 5 is an enlarged fragmentary diagrammatic view taken on the line 5—5 of Fig. 2 illustrating the parts of the device in different positions for diverting a box from the conveyer.

Fig. 6 is an enlarged cross sectional view taken on the line 6—6 of Fig. 1 illustrating a unit of the device which has just collected a stack of boxes and is about to swing this into upright position.

Fig. 8 is a fragmentary diagrammatic cross sectional view through a string of stacks of boxes illustrating the manner in which these are moved along a stack track.

Fig. 9 is an enlarged fragmentary sectional view taken on the line 9—9 of Fig. 2.

Fig. 10 is a view similar to Fig. 9 illustrating the diversion of a box by a particular stacking unit.

Fig. 11 is a fragmentary diagrammatic perspective view illustrating the power control mechanism of a stacking unit.

Fig. 12 is a diagrammatic plan view of mechanism for manually selecting a group of stacking units for diverting boxes from a conveyer and determining the order in which said stacking units function.

Figs. 13 and 14 are diagrammatic cross sectional views illustrating the operation of the mechanism shown in Fig. 12.

Figure 1:
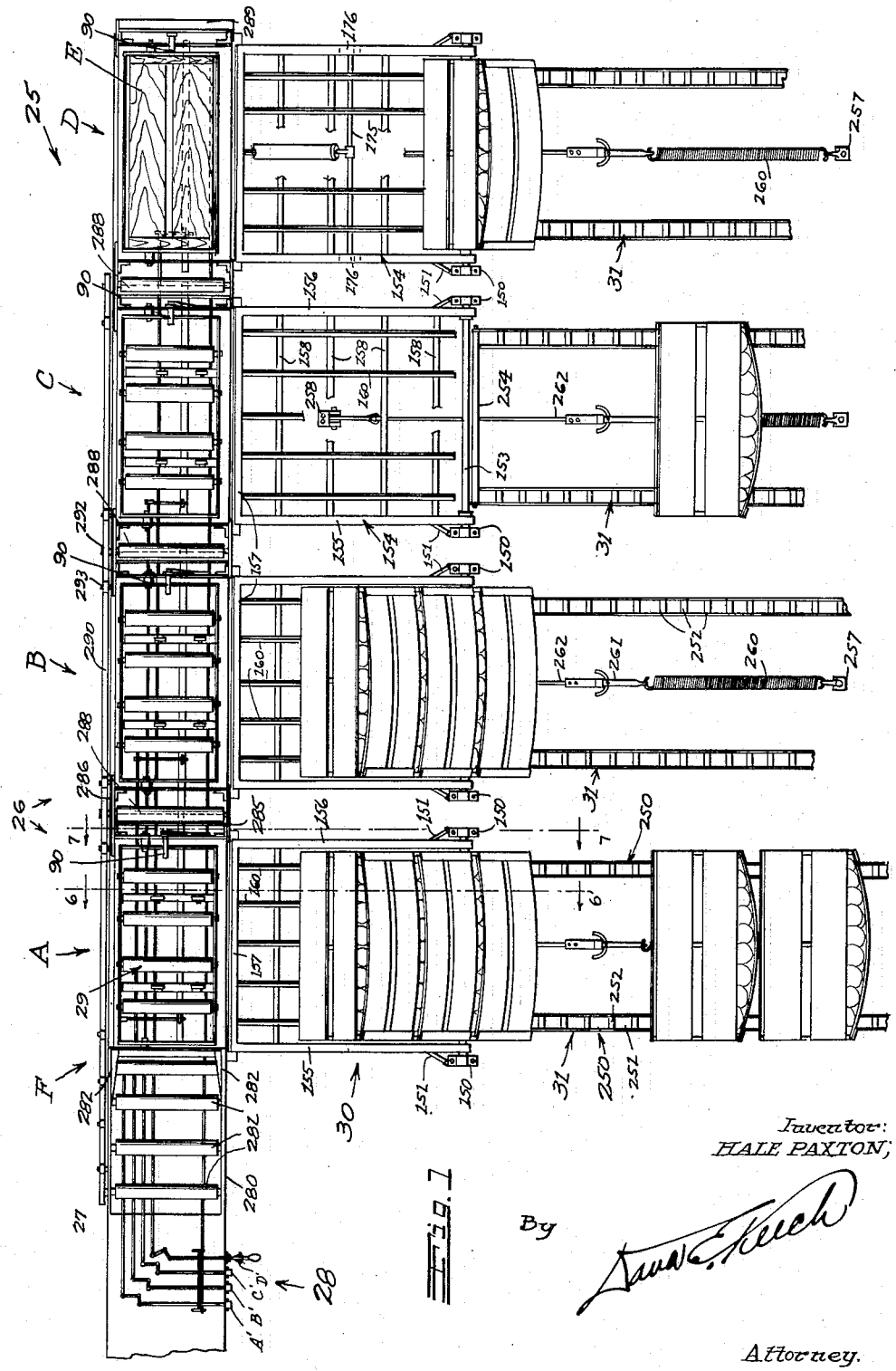
Fig. 1 is a plan view of a preferred embodiment of my invention.

Referring specifically to the drawings, and particularly to Fig. 1, the preferred embodiment of my invention illustrated herein comprises a box segregating and stacking device 25 which includes a plurality of identical stacker units 26 (separately identified as units, A, B, C, and D), a skeleton power conveyer 27, and a control mechanism 28.

*A stacker unit 26*

Each stacker unit 26 includes a conveyer section 29, a stack collector 30, and a stack storage track 31.

*A conveyer section 29*

Referring now to Figs. 2 to 6 inclusive, each conveyer section 29 has a frame 32 which includes four corner posts 33, preferably of angle iron. The rear pair of these posts are connected by a horizontal angle iron 34 and a base bar 35, and the front pair by two horizontal angle irons 38 and 39 and a base bar 40.

Connecting one end pair of the corner posts 33 are transverse bars 43, 44 and 45. Connecting the other end pair of these posts are transverse bars 48, 49, 50 and 51, the bar 51 being preferably formed of angle iron. Resting on and secured to a floor 52 on which the device 25 is supported is a pair of ramp supports 55 which are connected by plates 56 to the frame angle iron 39, as shown in Fig. 11, the purpose of these supports being made evident hereinafter.

Pivotally supported on the frame bars 43 and 49 is an idle roller section 60 which includes end plates 61 and 62 which are connected by longitudinal angle iron members 63 and 64, there being idle rollers 65 supported between the members 63 and 64.

Provided in the end plate 62 is a hole 70, the purpose of which will be made manifest hereinafter. Connecting the longitudinal angle iron member 63 to the frame angle iron 34 is a tension spring 71. Provided on the front angle iron member 64 (see Figs. 9 and 10) is a control finger 75.

Referring now to Figs. 2, 3, 4 and 7, it is noted that a stop bar 80 is slidably mounted vertically on the right hand faces of the horizontal frame members 48, 49 and 50. The bar 80 is provided with slots 81 and 82. Secured upon the frame member 48 is a leaf spring 83, the free end of which lays over the stop bar 80 and is provided with a pin 84 which extends through the slot 81, through a suitable hole in the frame member 48, and into the hole 70 of the idle roller section end plate 62. Extending through the slot 82 and into the frame member 50 is a bolt 85, the pin 84 and bolt 85 being so positioned in the slots 81 and 82 as to allow the bar 80 a vertical sliding movement. The upper edge of the idle roller section end plate 62 is notched out to make room for a stop finger 90 which is fixed on the upper end of the stop bar 80. Extending sidewardly from the bar 80 is a suitable supporting boss on which is mounted a roller 92.

Secured at their opposite ends on horizontal frame members 34 and 38 are angle irons 100 and 101. Extending upwardly from the angle irons 100 are a pair of plates 102 having idle rollers 103 the purpose of which will be made evident hereinafter. Extending downward respectively from the angle irons 100 and 101 are a slide bearing 105 and a bearing plate 106. Pivotally mounted on the bearing plate 106 is a latch 107.

Formed on the horizontal frame member 44 is a bearing 108 and upon the horizontal frame member 50, a guide 109.

Supported by the bearings 105 and 108 and the guide 109 is a stop bar control mechanism 112. The mechanism 112 includes a tubular shaft 113 which is slidably disposed in the bearings 105 and 108 and has a recess 114 formed in a right hand end thereof. Provided on the shaft 113 is a stop collar 117, the latter having a tooth 118 extending downwardly therefrom and an eye 119 formed upwardly therefrom. The mechanism 112 includes a cam bar 120 of rectangular cross section which is guided by the plate 109 and has a stop operating cam 121 and a restraining shoulder 122, the cam 121 being in alignment with and disposed beneath the roller 92. The bar 120 has an extension 125 which is preferably cylindrical and extends into the recess 114 of the tubular shaft 113. The end of the extension 125 is normally held in contact with the inner end of the recess 114 by a tension spring 127 which is coiled about the extension 125, opposite ends of the spring being secured to the extension 125 and the shaft 113.

When the latch 107 is disposed against the shoulder 122 as shown in Fig. 2, the spring 127, in urging the cylindrical extension 125 into the recess 114, pulls the hollow shaft 113 to the right so that the collar 116 comes against the bearing 105. At this time the roller 92 is disposed at the bottom of the cam 121 and the stop bar 80 is in downwardmost position as shown in this figure.

Formed on the horizontal frame member 43 so as to extend laterally therefrom is a guide ear 130, and a bracket 131 is secured upon the frame member 44 so as to extend downwardly therefrom, there being suitable apertures formed in the ear 130 and bracket 131 in vertical alignment with each other. Slidably extending through these apertures is a rod 135 upon which a latch member 136 is adjustably secured by a set screw 137. Disposed about the rod 135 between the bracket 131 and the latch member 136 is a compression spring 138. The latch 136 extends into close proximity with the frame member 44 so as to be guided thereby and prevent its rotation about the rod 135. The latch member 136 is provided with a catch 140 which is adapted to engage with the tooth 118 on the collar 117 when the hollow shaft 113 is moved to the left as shown in Fig. 3 so as to retain the shaft 113 in this position.

Pivotally mounted on upper portions of the front pair of corner posts 33 as shown in the right hand side of Fig. 2 are a pair of emergency box stops 139 which are continually urged upwardly by tension springs 140 connected to upper ends of the posts 33. Each of the emergency stops 139 has a lug 141 extending forwardly therefrom.

*A stack collector 30*

Secured to the floor 52 opposite each of the conveyer sections 29 is a pair of bearing brackets 150 which are connected by guy rods 151 to a middle portion of the base bar 40 of that conveyer section. Mounted in the bearing brackets 150 is a shaft 153 to which is fixed a stack collector runway 154. The runway 154 includes side bars 155 and 156, an upper cross bar 157, and intermediate cross bars 158, these bars being all preferably formed of channel iron. The side bars 155 and 156 normally rest in inclined position on the upper ends of the runway supports 55 as shown in Figs. 5 and 6.

Disposed parallel with the direction of inclination of the runway 154 and mounted on the cross bars 157 and 158 is a series of box slide rails 160. Provided on the upper cross bar 157 is a pair of fingers 165 which, when the runway 154 is resting on its supports 55, engage the lugs 141 on the emergency box stops 139 so as to maintain these stops in depressed or inoperative positions.

Each runway 154 is adapted to receive boxes from its conveyer section 29 and when a stack of boxes is collected thereon, is adapted to be swung upward to set this stack on end. To accomplish this each runway 154 is provided with a power means 170 which has an automatic runway control 171 for setting it into operation. The power means 170 includes a shaft 175 supported by brackets 176 on runway side bars 155 and 156. Pivotally connected to the shaft 175 is the head end of a piston rod 178 of a hydraulic cylinder 179, the lower end of which is pivotally mounted on lugs 180 provided centrally on the base plate 40 of the conveyer section 29.

The automatic runway control 171 is best shown in Figs. 5, 6 and 11 and includes a two-way valve 185 which is connected by a flexible hose 186 to the lower end of the cylinder 179, the hose 186 being adapted to be connected through the valve 185 with either of a pair of pipes 187 and 188. The pipe 187 connects with the exhaust of a pump 190 while the pipe 188 connects with the intake of this pump. The pipe 188 has a branch 191 which leads to a liquid reservoir (not shown). Connected between pipes 187 and 188 is a pressure valve 192 which causes a given pressure to be maintained by the pump 190 and the pipe line 187. The valve 185 has an arm 195 which, when in upward position as shown in Fig. 6, causes this valve to connect the flexible hose 186 with the high pressure pipe 187, and when the arm 195 is in position as shown in Fig. 5 it causes the valve 185 to connect the flexible hose 186 with the low pressure pipe 188.

Provided on the horizontal frame member 38 of the conveyer section 29, as shown best in Fig. 11, is a pair of bearings 198 carrying a rod 199 on which are fixed short arms 200, 201 and 203. The arm 201 is connected by a link 204 with the arm 195 of the valve 185. The runway control 171 also includes a two-box contact mechanism 210 which has a shiftable frame 211 mounted by bolts 212 on the runway frame member 155 and normally held upwardly by compression springs 213. The frame 211 has a plate 214 in which is formed a slot 215 to which extends a pin 216 provided on the end of a bell crank 217 which is pivotally mounted on the runway side bar 155. Provided on the bar 155 is a bracket 220 in which a bar 221 is slidably mounted, this bar being connected by a link 222 to an upwardly extending end of the bell crank 217. The sliding bar 221 is so mounted as to be opposite the arm 200 on the shaft 199.

Provided on opposite ends of the frame 211 are upwardly extending rollers 225 which are disposed greater distances apart than the width of one of the boxes which the device 25 is designed to handle. A single box may therefore slide downwardly over the rails 160 and over the two-box contact mechanism 210, depressing the rollers 225 alternately without actuating the bell crank 217. When two boxes come to rest on the rails 160 over the contact mechanism 210 as shown in Fig. 6, both of the rollers 225 are depressed so that the bell crank 217 is rocked and the arm 200 swung upwardly, thus rotating the shaft 199 and lifting the arm 195 so as to connect the pressure pipe 187 with the cylinder pipe 186 and admit fluid under pressure into the cylinder for a purpose and with a result which will be explained hereinafter.

Finally, the ramp control mechanism 171 includes a cam arm 230 mounted rigidly on a lower portion of the cylinder 179, this cam arm having a cam head 231 with a low cam surface 232 and a high cam surface 233. Slidable vertically in a suitable square hole in the frame bar 39 and another hole in a bracket 235 mounted on the upper frame bar 38 is a reversing tappet 236, this tappet having a roller 238 mounted on its lower end so as to rest on the cam head 231. The upper end of the tappet 236 is disposed just under the arm 203 for a purpose which will be made evident hereinafter.

*A stack storage track 31*

The stack storage track 31 of each stacker unit 26 is disposed in front of and in alignment with the stack collector 30 thereof. This track may have any form of construction along which stacks of boxes may be slid or otherwise conveyed for the purpose of transporting these somewhere or of storing them until it is convenient to load these boxes in cars, in a precooler, or otherwise dispose of them. The track 31, however, is preferably formed of a pair of rails 250 which may be formed of channel iron base members 251 in which are pivotally mounted series of rollers 252, the members 251 being preferably secured to the floor. Preferably mounted between the ends of the rails 250 adjacent to the stack collector shaft 153 is a roller 254 which is disposed on the same level as the rollers 252.

As shown in Fig. 8, each storage track 31 is provided with a stack shifter 256 which includes a bracket 257, secured to the floor 52 between the rails 250, and a bracket 258, secured to the floor beneath the ramp 154. Secured to the bracket 257 is one end of a tension spring 260, the other end of which connects to a strap 261 having a cable 262 which passes around a pulley 263 mounted on the bracket 258, and upwardly to where it connects to one of the cross bars 158 of the stack collector runway 154 thereabove. The strap 261 has a resilient guide 265 secured thereto which engages the floor and keeps the strap at a uniform height from the floor. Extending upwardly from the strap is a yieldable box gripping arm 266.

*The skeleton power conveyer 27*

Referring now to Figs. 1 and 2, the skeleton power conveyer 27 includes a frame 280 which is connected to the conveyer section 29 of stacker unit A and supports a number of power driven conveyer rollers 281. Provided on the frame 280 are box guides 282 which guide boxes from the rollers 281 so that these will be directed centrally onto this conveyer section 29.

The stacker units 26 are all disposed alongside each other as shown in Fig. 1 and the conveyer sections 29 of the adjacent units are connected together by plates 285 and 286 between each pair of which plates is provided a power driven roller 288 and an angle iron 289, the purpose of which will be made manifest hereinafter. All of the rollers 281 and 288 are driven by a chain 290 which extends alongside the rear edges of the device 25 and is guided into mesh with suitable sprockets 292 provided on these rollers by idle sprockets 293 mounted on the rear pairs of posts 33 of the respective conveyer sections 29.

The control mechanism 28

Referring particularly to Figs. 1, 2, 12, 13 and 14, the control mechanism 28 of my invention includes a series of hand levers 300 which may be separately designated as hand levers A', B', C' and D'. Each of the hand levers 300 is connected by a link 301 to a bell crank 302 mounted on a member 304 of the frame 280. Each of the links 301 has a shoulder 306 extending upwardly therefrom, this shoulder having a flat upper surface 307. The bell cranks 302 also are connected to rods 308 which extend at right angles to the links 301 and longitudinally beneath the conveyer 27. One of the rods 308 terminates at each of the stacker units 26 and is adapted to control that unit. As shown in Figs. 5 and 6, bearing brackets 310 are provided on the horizontal frame members 44 for guiding those of the rods 308 which extend past each of these frame members. On each end of a rod 308 which is disposed opposite one of the stacker units 26 is secured a collar 312 having a finger 314 which extends through the eye 119 of the stop bar control mechanism 112 of that stacker unit 26. As shown in Fig. 12, there is also mounted on the frame 280 a slide bearing 315 through which the rods 308 slide. Collars 316 are provided on the rods 308 on the right hand side of the slide bearing 315 and springs 317 between this bearing and the collars 316 constantly urge each of the rods 308 towards the right.

As shown in Figs. 13 and 14, bearings 320 are mounted on the frame 280 and a shaft 321 is rotatably mounted in these bearings so as to extend beneath the links 301 and also to the right throughout the length of the device 25. Aligned with the bearings 320 are suitable openings in the plates 106 of each stacker unit 26 and the shaft 321 extends through these openings and journals therein as shown in Figs. 2 and 12. Fixed to the shaft 321 as shown in Figs. 12, 13 and 14 is a pair of arms 324 each of which is provided with a spring 326 which tends to maintain the arms 324 in upright position as shown in full lines in Figs. 12 and 14. Pivotally swung on the arms 324 is a U-shaped rod 328, the middle portion of which extends across all the links 301 just in front of the shoulders 306 when the handles 300 are all in upright position as shown in Fig. 13. Mounted on the frame 280 on opposite sides of the group of links 301 is a pair of sloping stationary cams 330. Mounted on the shaft 321 opposite and beneath each of the latches 107 is a lifting finger 335. Also mounted on the shaft 321 is a group of arms 336 each of which is disposed in one of the stacker units as shown in Fig. 2. Pivotally mounted on the end of each of the arms 336 is a rod 339 which extends upwardly and is guided by an ear 340 formed on the angle iron frame member 101.

The upper end of the rod 339 in each of the stacker units 26 is disposed just below the control fingers 75 of that unit as shown in Figs. 2, 9 and 10.

Operation

The operation of my invention is as follows:

The device 25, when used in the handling of shipping cases freshly packed with citrus fruits or other farm products, is disposed adjacent to a lidder which may be placed in position so that boxes discharged from the lidder are delivered directly onto the rollers 281. It is thus seen that the levers 300 of the control mechanism 28 are handy for actuation by the man operating the lidder.

As mentioned hereinabove, the device 25 is adapted to be controlled so as to segregate boxes discharged thereon and form these into stacks. The device 25 illustrated herein is adapted to segregate the boxes fed thereto into four groups and form the boxes in each group into stacks, each of these groups being handled by one of the stacker units 26.

To accomplish this the lidder operator notes the brand on each box and which usually indicates the stacker unit to which it is to go, and pulls forwardly that control handle 300 which controls that stacker unit. As shown in Figs. 12 and 14, the control handle D' has been pulled forward for the purpose of delivering a box to the stacker unit D. This movement of the lever D' pulls its link 301 forward so that the shoulder 306 on said link engages the rod 328 and swings the arms 324 to their dotted line position in which these are shown in Fig. 14 so as to rotate the shaft 321, causing the fingers 335 thereon to lift all the latches 107 in the device 25 into their dotted line positions shown in Fig. 14. As the rod 328 is moved forward it is lifted by the stationary cams 330 so as to be moved above the shoulder 306 engaging it, permitting the springs 326 to return the arms 324, the shaft 321 and fingers 335 thereon to their full line positions as shown in Fig. 14. While the latches 107 were thus elevated by the fingers 335 the stop bar control mechanism 112 of the stacker unit D is shifted to the left as shown in Fig. 4, so that the cam 121 engages the roller 92 of the stop bar 80 of this unit and lifts the bar upwardly, bringing the stop finger 90 above the level of the idle roller section 60 of this stacker unit.

After the operator has pulled out the lever D' with the result above described, he delivers a box E onto the power rollers 281. It is now to be noted that the skeleton power conveyer 27 normally unites with the idle roller section 60 of the various stacker units 26 to provide a composite distributing conveyer F which distributes boxes fed onto it to the various stacker units 26. Each box delivered to this conveyer F is impelled by the power rollers of the skeleton conveyer 27 so that this box passes over each idle roller section 60 onto the next power roller of the skeleton conveyer 27 until the box is stopped by an upraised one of the fingers 90.

In the present instance box E travels the entire length of the composite conveyer F until it engages the finger 90 of the stacker unit D as shown in Fig. 1. The box E is now not only stopped but causes the stacker unit D to function, as shown in Fig. 2, in the right-hand unit 26 illustrated therein; that is, the stop bar 80 is tilted until its upper end engages the angle iron 289 beyond unit D, thus withdrawing the pin 84 from the hole 70 in the end plate 62 of the idle roller section 60 of this stacker unit. Owing to the position of the axis upon which the idle roller section 60 is mounted on the horizontal frame members 43 and 49, the weight of the box E tilts this roller section forwardly as shown in Figs. 5, 6, and 10.

This brings the upper surface of the rollers 65 below the inclined plane in which the rollers 103 are disposed so that the weight of box E is transferred to the rollers 103 and is discharged by gravity laterally onto the rails 160 of the runway 154 of the stacker unit D. When the box E is thus delivered onto the runway 154 it slides downwardly over the rails 160 until it comes into contact with the roller 254 or engages a box previously delivered to this collector 30 and retained thereon for the formation of a stack.

When the idle roller section 60 of unit D is tilted to discharge a box therefrom, the end plate 61 of this section engages the upper end of the rod 135 so that the catch 140 of this stacker unit is disengaged from the tooth 118 thereof, thus permitting this stop control mechanism 112 to be released from its catch with the result that this mechanism is slid back to its normal position in which it is shown in the left-hand portion of Fig. 2. This results from the pressure of that one of the springs 317 which acts upon the rod 308 controlling the stacker unit D. As a result of the stop actuating mechanism 112 of unit D returning to normal, the stop bar 80 of this unit drops down to its normal position in which the finger 90 thereof is out of the path of boxes traveling on the conveyer F.

Tilting of the idle roller section 60 of the stacker unit D also brings the finger 75 of this section down against the rod 339 of this stacker unit so as to rotate the shaft 321, thus swinging up the latch lifting finger 335, lifting all the latches 107 of the device 25 into the full line positions in which these are shown in Fig. 10. Further reference will be made hereinafter to the results of rotating the shaft 321 at this time.

As soon as the box E has passed from the conveyer section 29 onto the stack collector 30 the idle roller section 60 is returned to its normal horizontal position by tension of the spring 71 thereon. Owing to the pin 84 being continually urged inwardly by the spring 83, this pin enters the opening 70 when it comes opposite this pin so as to retain the idle roller section 60 in its normal horizontal position.

With the returning to normal of the stop control mechanism 112 of unit D the hand lever D' is automatically returned to its upright position and the operation of the device 25 to deliver a box to a preselected stacker unit is completed. The operation just described may be carried out with any one of the stacker units 26 in identically the same manner as described for the stacker unit D.

It is contemplated that in order to handle the flow of boxes normally passing over an automatic lidder in a fresh fruit packing house that it will be necessary to set the control mechanism 28 for the delivering of a second box to a specified stacking unit 26 before the control mechanism has been normalized by the discharge of a box for which it has been just previously set. In order to understand how this is accomplished, let us consider the operation described hereinabove as just having commenced and that the box E has just been placed on the rollers 281 with the hand lever D' pulled forwardly as shown in Fig. 14. Suppose now that the next box to be delivered to the lidder is destined for the stacker unit C. The operator, upon noting the destination of the second box, pulls the lever C' forwardly. This pulls the rod 308 which leads to stacker unit C and draws the hollow shaft 113 of the stop mechanism 112 of this stacker unit to the left, as shown in Fig. 3, until it is engaged by the latch 140 and retained in this position.

It is now to be noted that at the time lever C' is pulled outwardly, hand lever D' is already in outward position. Thus the rod 328 is at rest on top of the horizontal surface 307 of the shoulder 306 of the link 301 of the hand lever D', as shown in Fig. 14, and the corresponding shoulder 306 of the link 301 of the lever C' does not engage the rod 328 when lever C' is pulled outwardly. Accordingly, the shaft 321 is not rocked by pulling lever C' when lever D' is out, and therefore the latches 107 are not lifted by the latch lifting fingers 335.

Because latches 107 are not lifted in conjunction with the pulling forward of the hand lever C' when lever D' is out, the latch 107 in stacker unit C remains in place opposite the shoulder 122 of the stop bar control mechanism 112 of this unit so that the spring 127 thereof is stretched as shown in Fig. 3. This results in the stop bar 80 of unit C remaining down while the box E passes over this unit in traversing the conveyer F and continues on to its destination which is the stacker unit D.

As previously described, when the box E is discharged from the conveyer F in the stacker unit D, the finger 75 of this unit engages the rod 339 therein so as to rotate the shaft 321 and lift up all of the latches 107 into the full line position indicated in Fig. 10. When this lifting of the latches 107 takes place the cam bar 120 of stacker unit C is shifted, as shown in Fig. 4, by the action of the spring 127 so as to lift the stop bar 80 of this unit into box engaging position.

It is thus seen that the setting of the means for diverting the second box from the conveyer F is completed only when the first box has been diverted from this conveyer. It is also seen that this takes place automatically so as to assure that the first box will not be diverted by the stacker unit selected by the second lever 300 which is pulled forward.

The maximum speed of the automatic lidder with which the device 25 is designed to operate is such that the minimum interval between successive boxes will prevent any box passing entirely over the stacker unit for which it is destined before the box immediately preceding this box has been diverted by the stacker unit to which it was sent.

When the device 25 is being regularly operated as above described, it is clear that whenever the lidder operator sends a box onto the conveyer F one of the handles 300 will be already pulled out to determine the unit at which this box will be diverted from the conveyer F. It is also clear that as he swings this box onto the conveyer F he will receive another box at the lidder and will at once pull forward a second one of the levers 300 to predetermine the destination of this second box. When the device 25 is operated in this manner there will almost always be one of the hand levers 300 pulled forwardly so that the control mechanism 112 of the stacker unit which is selected by the pulling forward of another of the hand levers 300 will be held in restraint by its latch 107 as hereinabove described.

Figure 7:
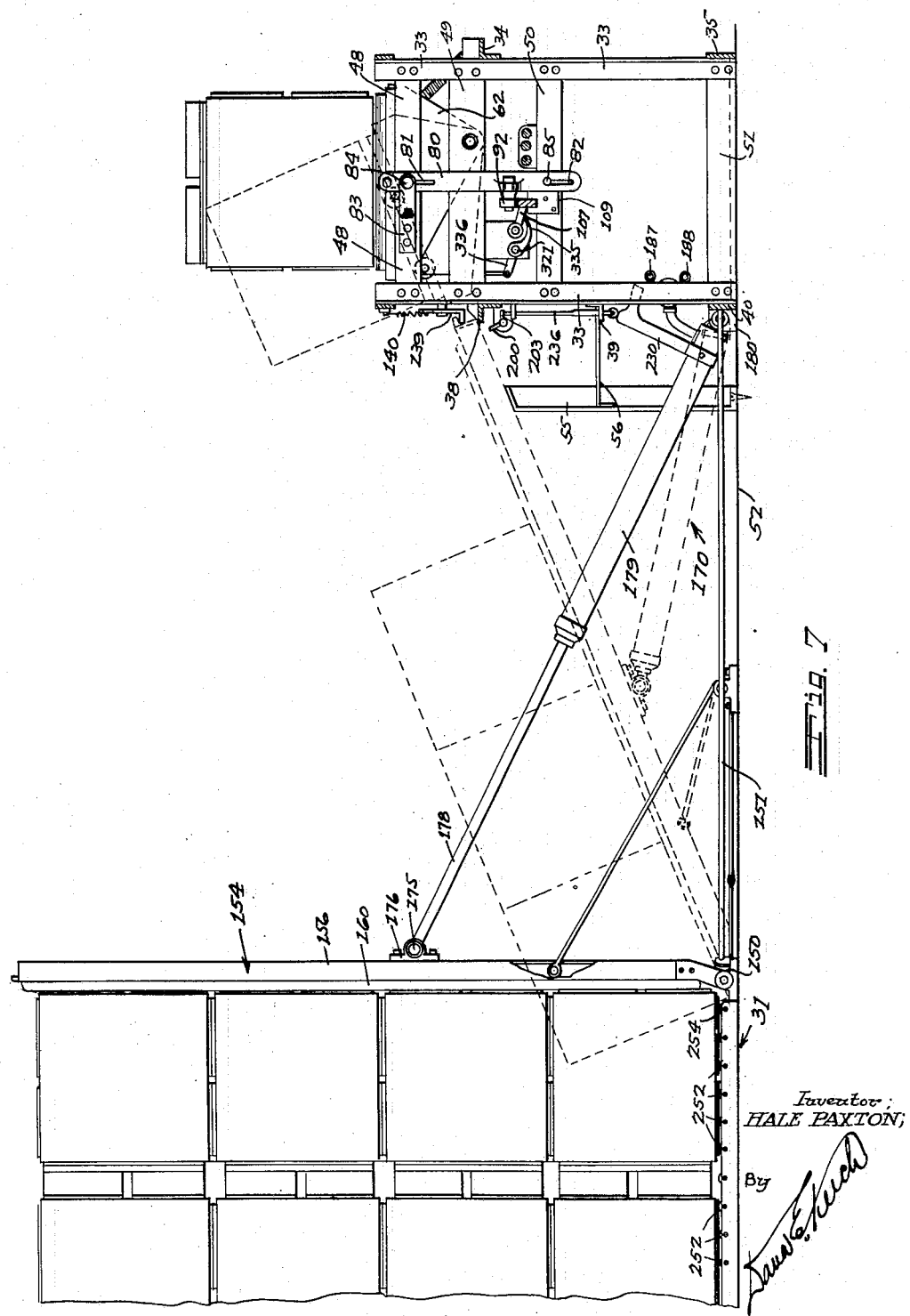
Fig. 7 is an enlarged cross sectional view taken on the line 7—7 of Fig. 1 illustrating a stack collector swung to deliver a stack in upright position.

As formerly described, the two-box control mechanism 210 of each stack collector 30 is actuated to divert fluid under pressure to the elevator cylinder 179 of that collector only when a full stack of boxes has been delivered onto that collector, as shown in Fig. 6. When this takes place on any of the collectors 30 the valve arm 195 of the valve 185 controlling the elevator cylinder 179 of that particular collector is swung upwardly into the position in which it is shown in Fig. 6. This causes fluid to be admitted from the pressure line 187 to the cylinder 179, which lifts the runway 154 into the position in which it is shown in Fig. 7, and rotates the stack of boxes on the runway until this stack is set up on end on the track 31 of that stacker unit. As soon as the runway 154 has set the stack on end, as shown in Fig. 7, the high cam surface 233 of the cam head 231 comes under the roller 238 so as to lift the tappet 236 and return the arm 195 of the valve 185 into its downward position as shown in Fig. 5. This disconnects the pressure feed line 187 with the cylinder hose 186 and connects the latter with the low pressure line 188 so that action of the spring 260 which has been stretched by the elevating of the runway 154 returns this runway downwardly, forcing the oil in the cylinder 179 out into the low pressure line 188. At the time this runway 154 returns into its lower position, the box gripping arm 266 engages an edge of a lower side slat of the lowermost box of the stack just set on end so as to shift this stack along the tracks 31 out of the way of the next stack to be set on end on these tracks.

In order to prevent the discharge of a box from the conveyer F at a given stacker unit 26 when the runway 154 of that unit is disposed out of its lower box receiving position, the box stops 139 are released when the runway 154 lifts upwardly so that the springs 140 lift these stops into positions in which they will hold a box on the idle roller section 60 of that particular stacker unit in case that roller section should tilt to deliver a box to this runway before the latter returns to its downwardmost position. On the runway's return to lower position the fingers 165 engage the lugs 141 of the stops 139 so as to swing these downwardly, this permitting any box which may have been retained on the roller section 60 by the stops 139 to be discharged onto the runway 154.

It is thus seen that I have produced a device for the segregating and stacking of boxes which is useful in handling boxes of fresh fruit after these are lidded. It is to be noted from the description that the entire operation of the device 25 is controlled by the manipulation of the hand levers 300 by the operator of the lidder, and one of the particular advantages of the machine is that a plurality of these levers may be actuated at one time to select which of the stacker units 26 a corresponding number of boxes are to be delivered to, and that this selection may be made prior to the delivery of the first of these boxes to its particular stacker unit.

While I have shown and described but a single embodiment of my invention, it is to be understood that many changes and modifications might be made in this without departing from the spirit of the invention or the scope of the appended claims.

What I claim is:

1. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway and tiltable into substantially the plane of said runway to discharge boxes by gravity from said section to said runway.

2. In a box conveying and stacking device, a conveyor, a box stacker associated with said conveyor and disposed laterally thereof, said stacker including an inclined runway having its upper end terminating below the level of said conveyor, said conveyor including a discharge section opposite said stacker and tiltable into substantial alinement with said runway to discharge boxes from said conveyor to said runway by gravity.

3. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway, laterally inclined supporting means beneath the normal level of said discharge section for receiving the weight of boxes thereon upon the tilting of said section to project them laterally by gravity onto said runway.

4. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway, an inclined support mounted beneath said tiltable discharge section below the normal level thereof and adapted to project above the level of said section when the latter is tilted whereby to receive the weight of a box from said tiltable section and project the same laterally thereof by gravity onto said runway.

5. In a box conveying and stacking device, a conveyor, a box stacker associated with said conveyor and disposed laterally thereof, said stacker including an inclined runway having its upper end terminating below the level of said conveyor, a discharge section in said conveyor opposite said runway, inclined supporting means mounted beneath said discharge section below the normal level thereof, said discharge section being tiltable to expose said inclined supporting means and to transfer the load from said section to said supporting means to be discharged by gravity laterally thereof onto said runway.

6. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway, laterally inclined supporting means beneath the normal level of said discharge section for receiving the weight of boxes thereon upon the tilting of said section to project them laterally by gravity onto said runway, said inclined supporting means including a plurality of rollers adapted to engage the under surface of a box carried on said discharge section upon the tilting of the latter.

7. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway, an inclined support mounted beneath said tiltable discharge section below the normal level thereof and adapted to project above the level of said section when the latter is tilted whereby to receive the weight of a box from said tiltable section and project the same laterally thereof by gravity onto said runway, said inclined supporting means including a plurality of rollers adapted to engage the under surface of a box carried on said discharge section upon the tilting of the latter.

8. In a box conveying and stacking device, a conveyor, a box stacker associated with said conveyor and disposed laterally thereof, said stacker including an inclined runway having its upper end terminating below the level of said conveyor, a tiltable discharge section in said conveyor opposite said runway, idle rollers mounted in stepped relation beneath the normal level of said tiltable section and substantially in the plane of said runway and adapted to engage the bottom of a box carried on said section upon the tilting of the latter to discharge said boxes by gravity onto said runway.

HALE PAXTON.